Aug. 12, 1969   M. A. JAMINI   3,461,005

P-CONTACT FOR COMPENSATED P-GERMANIUM CRYSTAL

Filed Sept. 1, 1967

INVENTOR.
MARCO A. JAMINI
BY

United States Patent Office 3,461,005
Patented Aug. 12, 1969

3,461,005
P-CONTACT FOR COMPENSATED P-GERMANIUM CRYSTAL
Marco A. Jamini, Brookhaven, N.Y., assignor to the United States of America as represented by the United States Atomic Energy Commission
Filed Sept. 1, 1967, Ser. No. 665,688
Int. Cl. H01l 7/44
U.S. Cl. 148—186                                3 Claims

ABSTRACT OF THE DISCLOSURE

A p-contact and a method of making a p-contact for a lithium diffused and compensated p-germanium crystal. A gallium-indium eutectic is brushed on the surface of such a crystal from which the lithium n-contact has been removed and then heated to 400–600° C. to obtain diffusion of the eutectic into a surface layer of the crystal face to form the desired contact.

Background of the invention

The invention described herein was made in the course of, or under a contract with the U.S. Atomic Energy Commisison.

Prior to the development of semi-conductor radiation counter devices, the detection and measurement of radiation was carried out principally in gaseous ionization chambers. The application of solid state counting devices to the measurement of radiation made it possible, due to their greater density and stopping power, to achieve complete absorption in much smaller volumes while at the same time obtaining greater ruggedness and speed of operation.

In the detection of gamma radiation, lithium-drifted germanium detectors have been produced which have relatively large volumes sensitive to gamma rays. A detector of this type may be produced by taking an ingot of horizontally grown p-type germanium of about 3½ inches in diameter and diffusing lithium in the two opposite surfaces thereby producing an $n^+pn^+$ structure with two diodes back to back. The ingot is then subject to an AC voltage and the lithium is drifted into the germanium from the two surfaces on alternate half cycles of the AC field. When the two diffused regions meet, producing a compensated region of about 2 cm., one of the n-contacts on the germanium is removed and a p-contact is substituted. The germanium produces the electrical impulses in response to the incident gamma radiation while the diffused lithium acts to cancel or neutralize the effect of the acceptor-doping, and thus the region containing the lithium is referred to as the compensated region. The resultant pIn detector is an excellent device for detecting and measuring gamma radiation and is finding widespread use in a variety of applications including that of monitoring gamma radiation in and around nuclear reactors.

One of the difficulties involved in the preparation of detectors of this type is that of preparing electrical contacts on the detectors under conditions of heat and pressure not damaging to the crystal. Good contacts have been very difficult to obtain without resorting to elaborate and expensive techniques which do not always produce reliable and trouble-free contacts on the detectors.

Summary of the invention

The present invention overcomes the aforementioned difficulties in obtaining satisfactory electrical p-contacts on compensated p-germanium semi-conductor material by utilizing a gallium indium alloy liquid at room temperature which is readily applied and diffused into the base material. Indium alone does not wet properly the surface of the germanium. Gallium requires some heating above room temperature for melting and so is much less convenient to use.

One of the important features of this invention is the ease and convenience in making the contact. At normal room temperature gallium-indium alloys within a specific range including the eutectic is liquid so that it is merely brushed onto the exposed surface. The liquid is then diffused into the surface by heating after which the excess material is wiped away. The resultant contact is effective, reliable, and dependable.

It is thus a principal object to produce an improved electrical contact for a semi-conductor material.

Other objects and advantages of this invention will hereinafter become obvious from the following description of a preferred embodiment of this invention taken with reference to the accompanying drawing.

Description of the preferred embodiment

Figure 1:
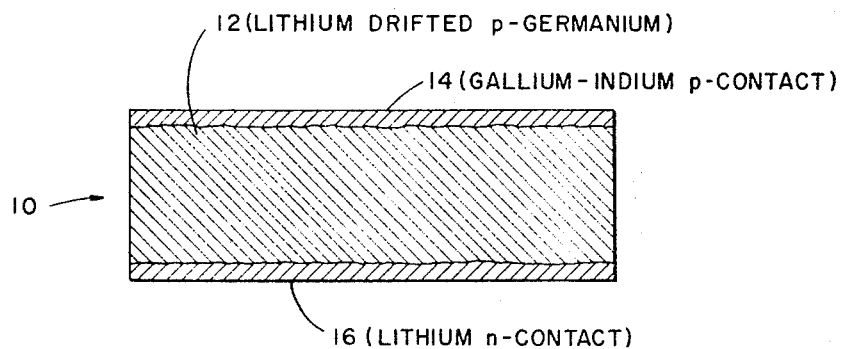
FIGURE 1 illustrates a cross-sectional view along 1—1 of FIG. 1a of a detector embodying the principles of this invention.
Figure 1A:
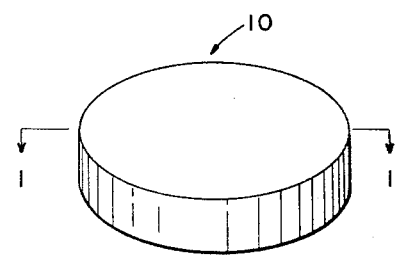
FIGURE 1a is an isometric view of the detector shown in FIG. 1.

Referring to FIGS. 1 and 1a there is shown in its completed form a detector 10 consisting of a block 12 of compensated p-germanium having a p-contact 14 consisting of a diffused layer of a gallium-indium alloy and an n-contact 16 consisting of a layer of diffused lithium. The following is an example of such a detector made in accordance with this invention.

A commercially available slice of horizontally grown p-germanium crystal was used. While shape or size is not critical, the crystal used was cylindrical with a circular cross-section and had a diameter of about 5 cm. and a thickness of about 2 cm. The flat, parallel surfaces of the crystal were etched to remove surface defects and a hot oil emulsion of melted lithium coated on both of the flat faces. To diffuse lithium into the crystal surfaces, the coated crystal was maintained in an oven at a temperature of about 350–375° C. for about 10 minutes in addition to time necessary to heat the crystal up and cool it off gradually afterward. After cooling to room temperature the remaining emulsion was washed away in water leaving lithium coated flat surfaces of the crystal.

Electrodes were then clamped to the lithium coated flat faces of the crystal and an AC voltage of about 200 volts R.M.S. applied to drift gradually the lithium into the body of the crystal. As is understood in the art, the crystal acts as two diodes back to back and drifting occurs during one half of each cycle when each diode is reverse biased. As the compensated or drifted regions gradually extend further into the crystal from opposite faces, they meet so that the whole crystal is then compensated. The practical limit of compensation in this manner was found to be about 1 cm. from each surface so that a 2 cm. thick wafer of crystal can thus be compensated.

Figure 2:
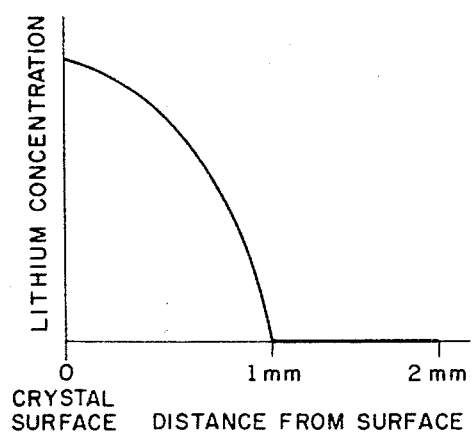
FIGURE 2 shows an idealized graph of relative lithium concentration versus depth in a diffused p-germanium crystal.

For a brief description of this drifting or compensation process, reference is made to FIG. 2 wherein is shown a graph illustrating schematically lithium concentration against depth of diffusion. The bottom horizontal line represents the concentration of the doping agent in the p-germanium crystal. It is seen that the lithium concentration at the surface of the crystal is much higher than the concentration of the doping agent, and the order of magnitude is a multiple of about $10^4$. The concentration drops off rapidly and at about 1 mm. depth the concentrations of the lithium and the doping agent are about the same. The concentration of the lithium then remains level, after drifting is completed, at about the value of the doping agent and in this region the crystal is compensated. That is, the donor lithium cancels out the effect of the p-doping and the region in effect is intrinsic germanium. The levelling out of lithium concentration is in actuality not a sharp transition as the graph indicates. The latter indicates somewhat grossly only that levelling does take place.

In the 1 mm. deep region, where the available electrons of the excess lithium have no place to be used in covalent bonds, there is in effect a greater availability of holes because of the ease of movement of the electrons, and the region is conductive and in the nature of an n-contact. Thus, the crystal has been provided with an n-contact. The use of a conventional contact, by clamping or bonding to the surface of the crystal will complete any external circuitry.

Returning to a description of the preparation of detector 10, after compensation of the crystal was completed and the opposite surfaces provided with lithium n-contacts, one of the contacts was removed by grinding away the 1 mm. surface. Any other suitable method could be used. The exposed surface was etched to remove surface damage. Then, in accordance with this invention, the exposed surface of the germanium was coated with gallium-indium eutectic. This eutectic, which consists of 76% gallium and 24% indium, is liquid at normal room temperature and may be applied by merely brushing on the surface which it readily wets. Any gallium-indium alloy being liquid at ambient conditions can be used in accordance with this invention. A description of gallium-indium alloys including a phase diagram appears in the Journal of Metals, January 1952, pages 39–42.

After the eutectic was applied, a sheet of asbestos was coated on one side with the same eutectic. The crystal was placed on the asbestos with the coated surface in contact with the coated asbestos. The upper surface of the crystal was coated with lithium in oil. The crystal on the asbestos was then placed in an oven and heated to a temperature in the range of 300° C. to 500° where the temperature was maintained for about 10 to 15 minutes. The lithium oil coating on the upper surface reduces the tendency of out-diffusion by the lithium. If temperatures exceed this range there is an increasing tendency for the lithium to diffuse out while lower temperatures requires excessive exposure to complete the process. Contact with the coated asbestos provides a uniform diffusion and insures a good contact.

As a result of this heat treatment the eutectic diffuses into the surface to a depth of a few microns which is sufficient to create a p-contact. The crystal was then cooled gradually and the excess eutectic wiped away, leaving the completed detector as shown in the figure.

One of the important advantages of this invention is the simple and convenient way in which the contact can be applied. It is not necessary to provide pressures or apply temperatures locally which can damage or otherwise adversely effect the desired properties of the detector. Another important feature is that contacts made in accordance with this invention are more reliable and dependable than contacts produced by many of the previously used procedures.

It is thus seen that there has been provided a unique p-contact and a method of producing a p-contact on a compensated p-germanium crystal.

I claim:
1. The method of making a p-contact on a lithium compensated p-germanium crystal having an n-contact and an exposed germanium surface separated by a lithium compensated region, the steps comprising:
   (a) brushing under ambient conditions said exposed surface with an alloy of gallium and indium liquid at ambient conditions;
   (b) heating said crystal at 300 to 500° C. to diffuse said alloy into said surface; and
   (c) thereafter wiping away excess alloy liquid to leave a diffused layer of gallium-indium forming said p-contact.

2. The method of claim 1 in which said crystal is heated to diffuse said alloy for a period of 10 to 15 minutes.

3. The method of claim 2 in which during said heating the brushed surface of said crystal is in contact with a surface coated with said alloy to insure a relatively uniform diffusion of said alloy into said brushed surface.

References Cited

UNITED STATES PATENTS

| 3,212,943 | 10/1965 | Freck et al. | 148—188 |
| 3,329,538 | 7/1967 | Tavendale | 148—188 |
| 3,390,449 | 7/1968 | Fox | 148—188 |

RICHARD O. DEAN, Primary Examiner

U.S. Cl. X.R.
148—178, 185, 188